United States Patent
Baek et al.

(10) Patent No.: US 9,423,647 B2
(45) Date of Patent: Aug. 23, 2016

(54) DISPLAY DEVICE WITH MIRROR FUNCTION

(71) Applicant: Samsung Display Co., Ltd., Yongin, Gyeonggi-Do (KR)

(72) Inventors: Moon Jung Baek, Seoul (KR); Jung-Hyun Cho, Seoul (KR); Kang-Min Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 97 days.

(21) Appl. No.: 14/341,561

(22) Filed: Jul. 25, 2014

(65) Prior Publication Data

US 2015/0185562 A1    Jul. 2, 2015

(30) Foreign Application Priority Data

Dec. 31, 2013  (KR) .......................... 10-2013-0169356

(51) Int. Cl.
  *G02F 1/1335*   (2006.01)
  *G02F 1/1333*   (2006.01)
  *G02F 1/1347*   (2006.01)

(52) U.S. Cl.
  CPC ........ *G02F 1/133528* (2013.01); *G02F 1/1347* (2013.01); *G02F 1/133536* (2013.01)

(58) Field of Classification Search
  CPC .......... G02F 1/33528; G02F 1/133536; G02F 1/13363; G02F 1/1396; G02F 2001/133531; G02F 1/133377; G02F 1/133512; G02F 1/133345; G02F 1/133553; G02F 1/133555; G02F 1/136227; G02B 5/3033; G02B 5/3016
  USPC ........................................ 349/96, 84, 99, 113
  See application file for complete search history.

(56) References Cited

U.S. PATENT DOCUMENTS

| 5,986,730 | A  | * | 11/1999 | Hansen ............... G02F 1/13362 349/117 |
| 7,057,681 | B2 |   | 6/2006 | Hinata et al. |
| 7,495,719 | B2 |   | 2/2009 | Adachi et al. |
| 7,728,927 | B2 |   | 6/2010 | Nieuwkerk et al. |
| 7,903,335 | B2 |   | 3/2011 | Nieuwkerk et al. |
| 2008/0309852 | A1 | * | 12/2008 | O'Donnell ........ G02F 1/133536 349/74 |
| 2011/0273659 | A1 | * | 11/2011 | Sobecki .................. B60R 1/088 349/195 |
| 2012/0127394 | A1 | * | 5/2012 | Nakao ................. G02F 1/13471 349/61 |

(Continued)

FOREIGN PATENT DOCUMENTS

| JP | 2005-321717 | 11/2005 |
| JP | 2006-171333 | 6/2006 |
| JP | 2012-108351 | 6/2012 |

(Continued)

*Primary Examiner* — Mike Qi
(74) *Attorney, Agent, or Firm* — Innovation Counsel LLP

(57) ABSTRACT

A display device includes a display panel and a polarization conversion panel disposed on the display panel. The polarization conversion panel has two or more display area regions that are independently drivable in order to implement either a reflection mode or transmissive mode in each of those regions and thus enabling pattern implementation. The polarization conversion panel includes: a reflective polarizer disposed on the display panel; an absorptive polarizer facing and spaced apart from the reflective polarizer; a lower electrode(s) layer disposed on the reflective polarizer; an upper electrode(s) layer disposed on the absorptive polarizer; and liquid crystals disposed between the upper and lower electrode layers. At least one of the upper and lower electrode layers includes a respective plurality of independently drivable sub-electrodes.

16 Claims, 19 Drawing Sheets

(56) References Cited

U.S. PATENT DOCUMENTS

2012/0162592 A1* 6/2012 Takagi .............. G02B 27/2214
349/139
2015/0177563 A1* 6/2015 Cho .................. G02F 1/133536
349/96

FOREIGN PATENT DOCUMENTS

| KR | 10-2011-0010239 | 2/2011 |
| KR | 10-2012-0074499 | 7/2012 |
| KR | 10-1251403 | 4/2013 |
| KR | 10-1266965 | 5/2013 |

* cited by examiner

DISPLAY DEVICE WITH MIRROR FUNCTION

CROSS-REFERENCE TO RELATED APPLICATION

This application claims priority to and the benefit of Korean Patent Application No. 10-2013-0169356 filed in the Korean Intellectual Property Office on Dec. 31, 2013, the entire contents of which application are incorporated herein by reference.

BACKGROUND (a) Field

The present disclosure of invention relates to; as one example, a transmissive-type display device combination that also has a selective mirror function. However, the display device need not be a transmissive-type and the combination may still possess the selective mirror function.

(b) Description of Related Technology

Liquid crystal display devices are currently one of the most widely used type of flat or otherwise thin panel display devices, and they typically include two display panels on which electric field generating electrodes such as a pixel electrode and a common electrode are formed, and a liquid crystal layer interposed between the two display panels.

The liquid crystal display devices display their images by generating an electric field through a liquid crystal layer by applying a voltage to the field generating electrodes, where this determines alignment directions of liquid crystal molecules of the liquid crystal layer through the generated field, and thus controls polarization of incident light.

Personal hand-held terminals or liquid crystal display devices for outdoor display purposes basically have a portable size to meet the mobility needs of a user, and liquid crystal display devices may include an additional reflection function as well as a transmissive image forming function where the reflection function can be used in bright ambient light conditions for example.

When attached with an appropriate reflection film, the liquid crystal display device including the reflection function may act as a polarization dependent mirror when the liquid crystal display is in an off-state.

That is, among external light sources, the reflection film allows linearly polarized light which is polarized in a specific direction to be fully or partially transmitted back to the user, while not reflecting linearly polarized light that happens to be polarized in other than the one specific direction.

Accordingly, the liquid crystal display device can be used as a display device for displaying an image when it is driven for example in a transmissive mode, or as a selectively polarizing mirror with optional added functionality when it is not driven as the exemplary transmissive device.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a display device including a selective reflection mode capability, and particularly to implement a reflection mode for displaying a predetermined pattern.

A display device according to an exemplary embodiment includes a display panel and a polarization conversion panel disposed on the display panel in order to implement a selective reflection mode for displaying various patterns. The polarization conversion panel includes: a reflective polarizer disposed on the display panel; an absorptive polarizer facing and spaced apart from the reflective polarizer; a lower electrode(s) layer disposed on the reflective polarizer; an upper electrode(s) layer disposed on the absorptive polarizer; and liquid crystals disposed between the upper and lower electrode layers. One of the upper and lower electrode layers includes a plurality of sub-electrodes that are electrically separated from each other.

The lower electrodes layer for example may include a plurality of sub-electrodes, and the plurality of sub-electrodes may be divided into at least two regions of the display area that are then driven independently according to respective drive voltages applied thereto.

The upper electrodes layer may alternatively or additionally include a respective plurality of sub-electrodes, and the plurality of sub-electrodes may be divided into at least two regions for driving according to voltages applied thereto.

The lower electrode(s) layer may include: a plurality of first sub-electrodes spaced apart by a predetermined interval; an insulating layer positioned on the plurality of first sub-electrodes; and a plurality of second sub-electrodes spaced apart from each other while disposed on the insulating layer to cross the plurality of first sub-electrodes.

The upper electrode(s) layer may include: a plurality of first sub-electrodes spaced apart by a predetermined interval; an insulating layer disposed on the plurality of first sub-electrodes; and a plurality of second sub-electrodes spaced apart from each other while being disposed on the insulating layer to cross the plurality of first sub-electrodes.

The lower electrode(s) layer may include: a first sub-electrode; an insulating layer disposed on the first sub-electrode; and a second sub-electrode disposed on the insulating layer, wherein one of the first and second sub-electrodes may have a planar shape while the other may have a plurality of linear shapes.

The upper electrode(s) layer may include: a first sub-electrode; an insulating layer disposed on the first sub-electrode; and a second sub-electrode disposed on the insulating layer, wherein one of the first and second sub-electrodes may have a planar shape while the other may have a plurality of linear shapes.

The upper and lower electrode(s) layers may be made of a transparent conductive oxide (TCO).

The at least two regions may be independently driven.

A first polarizer disposed between the display panel and the reflective polarizer may be further included, and transmissive axes of the first polarizer and the reflective polarizer may coincide with each other.

The transmissive axis of the reflective polarizer may be perpendicular to that of the absorptive polarizer.

The transmissive axis of the reflective polarizer may be parallel to that of the absorptive polarizer.

The transmissive axis of the reflective polarizer may be perpendicular to its reflective axis.

A manufacturing method of a display device may include: preparing a display panel; preparing a reflective polarizer positioned on the display panel; preparing an absorptive polarizer spaced apart from and facing the reflective polarizer; preparing an upper electrodes layer and a lower electrodes layer respectively positioned on the reflective polarizer and the absorptive polarizer; and injecting liquid crystals between the upper and lower electrode layers. One of the upper and lower electrode layers is formed to include a respective plurality of sub-electrodes that are electrically separated from each other.

The plurality of sub-electrodes may be divided into at least two regions driven according to voltages applied thereto.

One of the upper and lower electrode layers may be formed to include: a plurality of first sub-electrodes spaced apart by a predetermined interval; an insulating layer disposed on the plurality of first sub-electrodes; and a plurality of second sub-electrodes spaced apart from each other while disposed on the insulating layer to cross the plurality of first sub-electrodes.

One of the upper and lower electrode layers may be formed to include: a first sub-electrode; an insulating layer positioned on the first sub-electrode; and an insulating layer positioned on the first sub-electrode. One of the first and second sub-electrodes may be formed in a large-sized planar shape while the other may be formed as a plurality of smaller-sized linear shapes.

The upper and lower electrodes may be formed of a transparent conductive oxide (TCO).

The at least two regions may be formed to be independently driven.

Preparing a first polarizer disposed between the display panel and the reflective polarizer may be further included.

According to the display device described above, the display device implementing a reflection mode can be provided.

In addition, the patterned reflection mode can be provided such that a fixed pattern is implemented according to user requirements.

DETAILED DESCRIPTION

Figure 1:
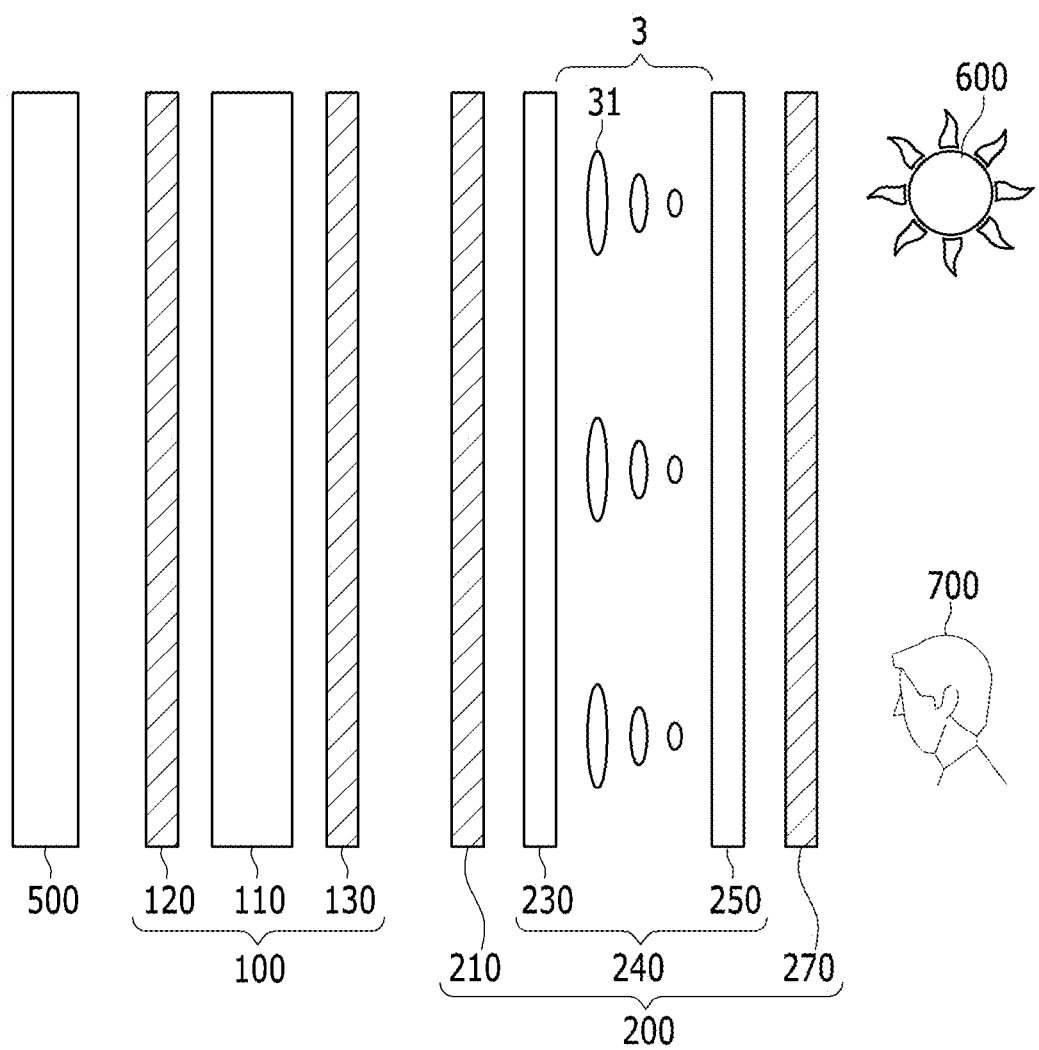
FIG. 1 is a schematic cross-sectional side view of a display device according to an exemplary embodiment of the present disclosure of invention.

The present disclosure of invention will be described more fully hereinafter with reference to the accompanying drawings, in which exemplary embodiments are shown.

As those skilled in the art would realize in light of the disclosure, the described embodiments may be modified in various different ways, all without departing from the spirit or scope of the present teachings.

In the drawings, the thickness of layers, films, panels, regions, etc. are exaggerated for clarity.

Like reference numerals designate like elements throughout the specification.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

A display device according to a first exemplary embodiment of the present disclosure of invention will now be described with reference to FIGS. 1 and 2.

FIG. 1 is a schematic cross-sectional side view of a display device according to the first exemplary embodiment. FIG. 2 is a partial cross-sectional view of a polarization conversion panel according to the first exemplary embodiment.

Referring to FIG. 1, the display device according to an exemplary embodiment includes, in left to right order, an optional backlighting unit 500, an electronically driven display panel 100 (which in one embodiment, can be a transmissive-type display panel 100) and a polarization conversion panel 200 that includes a selective reflection function. An external frontlighting light source 600 may be disposed in front of (e.g., on top of) the polarization conversion panel 200. The frontlighting light source 600 may be in the form of ambient sunlight, ambient room light and so forth, but is not limited to these and may include specially projected lights including those that may form an image if reflected back to an observing user 700 also positioned in front of (e.g., on top of) the polarization conversion panel 200.

The display panel 100 may include a liquid crystal panel 110 and polarizers 120 and 130 respectively positioned at opposite sides of the liquid crystal panel 110.

The liquid crystal panel 110 may include a lower substrate (not shown) including a first insulation substrate, an upper substrate (not shown) including a second insulation substrate which faces the first insulation substrate, and a respective liquid crystal layer (not shown) interposed between the lower and upper substrates.

The first insulation substrate may be provided with a plurality of pixel electrodes arranged in a matrix form.

Though not illustrated in the drawings, the first insulation substrate of LCD panel 110 may further include gate lines extending in a row direction, data lines extending in a column direction, and thin film transistors connected to the plurality of pixel electrodes in one-to-one correspondence.

A color filter and a common electrode may be provided on the second insulation substrate.

The color filter may include red, green, and blue color filters R, G, and B, and each of the color filters R, G, and B may be disposed to correspond to one pixel electrode.

The common electrode may be positioned on the color filter to generate a vertical electric field together with the pixel electrodes of the spaced apart other substrate.

The liquid crystal layer contains a plurality of liquid crystal molecules, and an alignment direction of the liquid crystal molecules is controlled by the generated vertical electric field.

The aligned liquid crystal molecules may display an image by controlling transmittance of light received for example from the optional backlighting unit 500.

In the present specification, the liquid crystal display panel in which the liquid crystal panel 110 generates the vertical electric field has been described, but it is not limited thereto. Alternatively, the display panel 100 may be a display device such as a plasma display panel (PDP), an organic light emitting diode display (OLED) device, a surface conduction electron-emitter display (SED), a field emission display (FED), a vacuum fluorescent display (VFD), an e-paper, and the like where the optional backlighting unit 500 is not needed.

Further, the second and first polarizers 120 and 130 are respectively positioned on opposite sides of the liquid crystal panel 110 so as to polarize the incident light from the light unit 500.

Particularly, a light transmissive axis of the first polarizer 130 positioned between the polarization conversion panel 200 and the liquid crystal panel 110 coincides with a light transmissive axis of a reflective polarizer 210 when simultaneous transmission of light is desired (e.g., that sourced from the optional backlighting unit 500) through both the first polarizer 130 and the reflective polarizer 210.

In other words, in order for the image formed by the liquid crystal panel 110 to be transmitted through the reflective polarizer 210 to a user positioned on the other side, the light transmissive axes of the reflective polarizer 210 and the first polarizer 130 should be disposed in parallel with each other.

When the liquid crystal display panel is used as the display panel according to the exemplary embodiment of the present disclosure, the display panel may further have the light unit 500 disposed behind it as well as the first and second polarizers 130 and 120.

In the present specification, the panel 100 has been described as being a transmissive type liquid crystal display panel merely as an example, but it is not limited thereto, and may be an organic light emitting diodes display panel, where in the latter case, the polarizers 120 and 130 and the backlighting unit 500 are omitted.

The light unit 500 includes a light source that emits light, and a light guide plate (not illustrated) for guiding the received light toward the display panel 100 and the polarization conversion panel 200.

As an example of the present invention, the light source may consist of at least one light emitting diode (LED), which may be disposed on at least one lateral side of the light guide plate.

That is, the light source may be an edge-type light unit positioned at a lateral side of the light guide.

However, the light unit 500 is not limited thereto, and it may have a direct-type structure in which the light source is positioned right under a diffusion plate (not shown), and the light source may consist of a fluorescent lamp instead of the light emitting diode (LED).

Irrespective of the image forming technology used by the display panel 100, the polarization conversion panel 200 includes a reflective-type first polarizer 210 disposed in front of the display panel 100 (for example on the first polarizer 130 of the exemplary LCD panel 100). The polarization conversion panel 200 further includes a respective lower and light-passing electrode 230 disposed on the reflective polarizer 210, an upper and light-passing electrode 250 which faces and is spaced apart from the lower electrode 230, and an absorptive-type polarizer 270 disposed on the upper electrode 250. A respective liquid crystal layer 3 containing liquid crystal molecules 31 is disposed in a space between the lower and upper electrodes 230 and 250. The combination of the lower and upper electrodes 230 and 250 and the liquid crystal layer 3 disposed therebetween is referred to herein as a constituent element 240.

That is, the reflective polarizer 210 and the absorptive polarizer 270 are respectively positioned on opposite sides of the polarization conversion panel 200. Further, though not illustrated, the lower and upper electrodes 230 and 250 may be respectively positioned on a supporting substrate.

That is, the supporting substrate may be positioned between the lower electrode and the reflective polarizer 210 or between the upper electrode and the absorptive polarizer 270.

The reflective polarizer 210 has a predetermined light transmissive axis which, in the case where display panel 100 includes polarizer 130, is parallel to a light transmissive axis of the first polarizer 130. The reflective polarizer 210 additionally has a predetermined light reflective axis which in one embodiment, extends in a direction perpendicular to the light transmissive axis of the reflective polarizer 210.

In other words, light that vibrates in a direction parallel to the transmissive axis of the reflective polarizer 210 is transmitted therethrough, while light that vibrates in a direction parallel to the reflective axis (e.g., perpendicular to the transmissive axis) is reflected.

A reflective polarization film may be used as the reflective polarizer 210, and a dual brightness enhancement film (DBEF), a wire grid polarizer (WGP), or a TiO2 multilayer film may be used as an example thereof, but it is not limited thereto.

The lower and upper electrodes 230 and 250 may be disposed between the reflective and absorptive polarizers 210 and 270, and may be made of a transparent conductive oxide (TCO) as an example.

One of the lower and upper electrodes 230 and 250 may include a plurality of sub-electrodes. For example, the lower electrode 230 according to the exemplary embodiment shown in FIG. 2, may include the plurality of sub-electrodes 231 and 233.

The plurality of the sub-electrodes 231 and 233 are not limited to a fixed shape, but the plurality of sub-electrodes 231 and 233 combined together should cover the entire display panel 100, and the plurality of sub-electrodes 231 and 233 may partially overlap each other.

Figure 2:
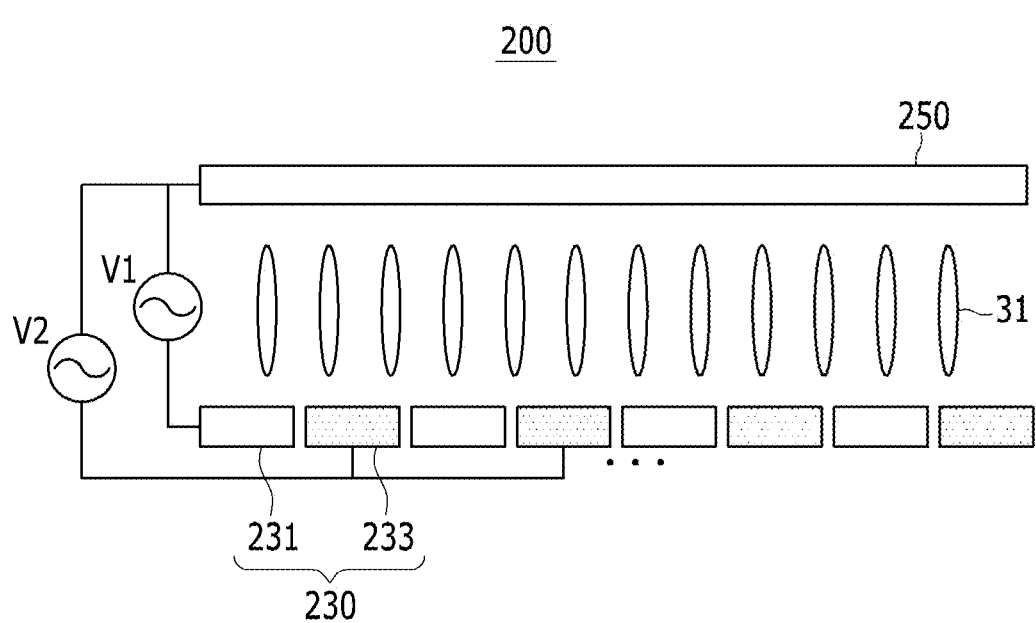
FIG. 2 is a partial cross-sectional view of a polarization conversion panel according to the exemplary embodiment of FIG. 1.

The plurality of sub-electrodes 231 and 233, as shown in FIG. 2, may be stripe-shaped linear members, and such linear members may be ones having a fixed width and being disposed in parallel to each other in an interdigitated manner.

In this case, each linear member is respectively applied with a respective predetermined voltage to generate a respective electric field together with the upper electrode 250.

The predetermined voltage signal may have a plurality of values, and the plurality of sub-electrodes may be applied with the plurality of voltages so as to be divided into a plurality of regions, respectively.

Referring to FIG. 2 as an example, the sub-electrodes 231 may be applied with a first voltage signal, while the sub-electrodes 233 may be respectively driven by a different second voltage signal.

Thus, a first region where the sub-electrodes 231 applied with the first voltage signal generate corresponding first electric fields in combination with the upper electrode 250 and a second region where the sub-electrodes 233 are supplied with the different second voltage signal generate the respective different electric field in combination with the upper electrode 250 and both fields may be respectively present at substantially the same time.

As an example, the exemplary embodiment in which two independent voltages are applied to be divided into two sub-regions has been described, but it is not limited thereto, and another exemplary embodiment in which a plurality of independent voltages are applied to be divided into a plurality of sub-regions may also be possible.

The liquid crystal layer 3 containing liquid crystal molecules 31 is positioned between the lower and upper electrodes 230 and 250.

The liquid crystal molecules 31 of the liquid crystal layer 3 may be realigned by applying an electric field between the lower and upper electrodes 230 and 250.

Thus, rotation and phase delay of incident light as it passes through the polarization conversion panel 200 can be adjusted by controlling the electric field between the lower and upper electrodes 230 and 250, for example from 0 V to a predetermined other voltage.

The absorptive polarizer 270 has a predetermined transmissive axis.

In one embodiment, the transmissive axis of the absorptive polarizer 270 is one of being perpendicular to or in parallel with the transmissive (T) axis of the reflective polarizer 210 depending on different liquid crystal modes and the rotations they respectively provide.

Only the light vibrating in a direction parallel to the transmissive axis of the absorptive polarizer 270 may pass through the absorptive polarizer 270, and the remainder of the light vibrating in substantially different directions is absorbed by the absorptive polarizer 270 and thus does not pass through.

An operation of a polarization conversion panel according to an exemplary embodiment will now be described in more detail according to different liquid crystal modes and with reference to FIGS. 3A and 3B, FIGS. 4A and 4B, and FIGS. 5A and 5B respectively.

Figure 3A:
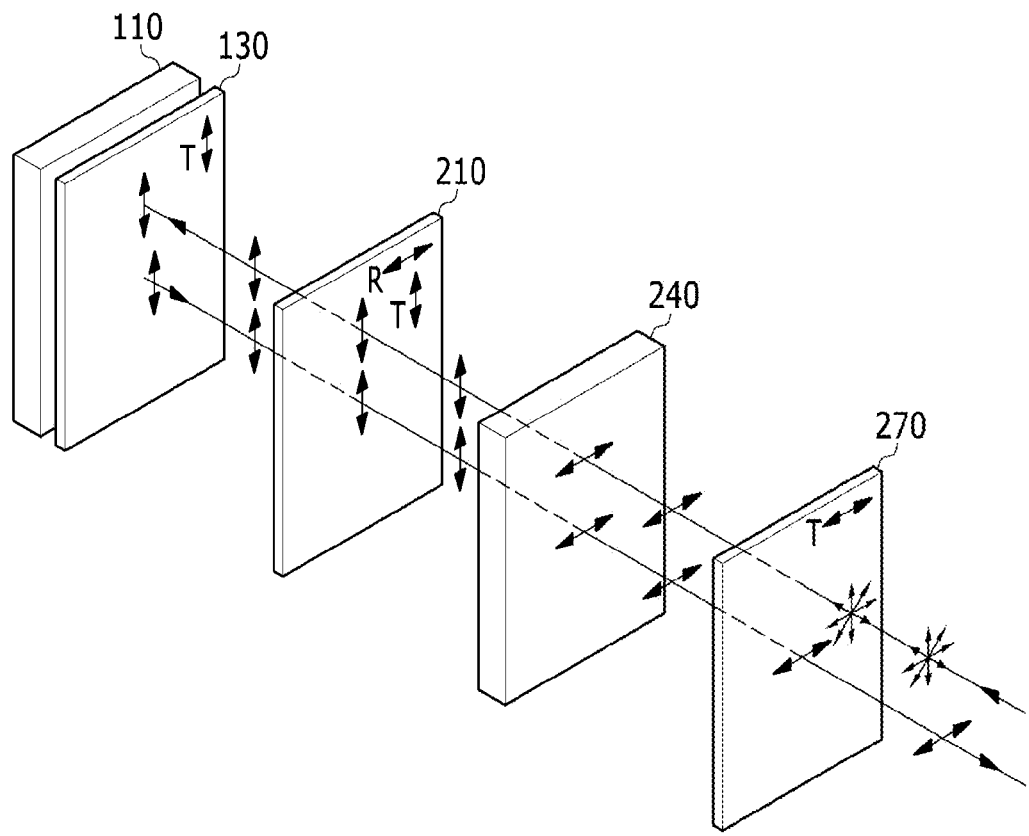
FIGS. 3A and 3B are schematic views showing operations of liquid crystals in a TN mode according to an exemplary embodiment of the present disclosure.
Figure 3B:
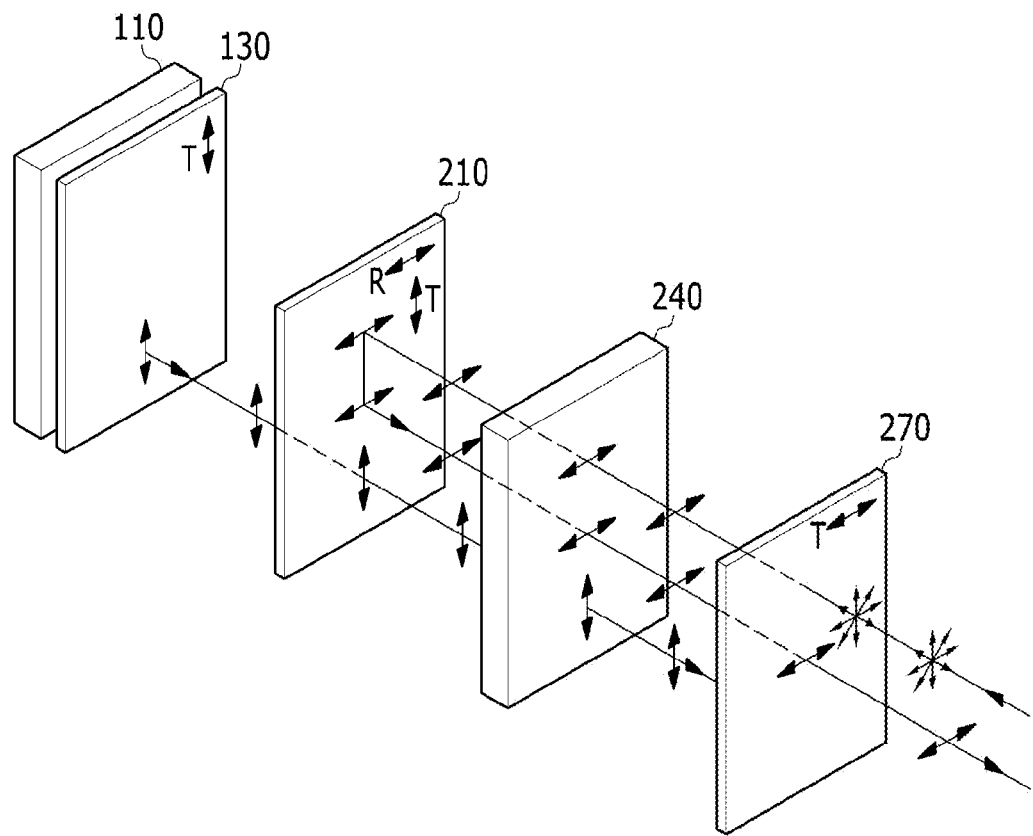
Figure 4A:
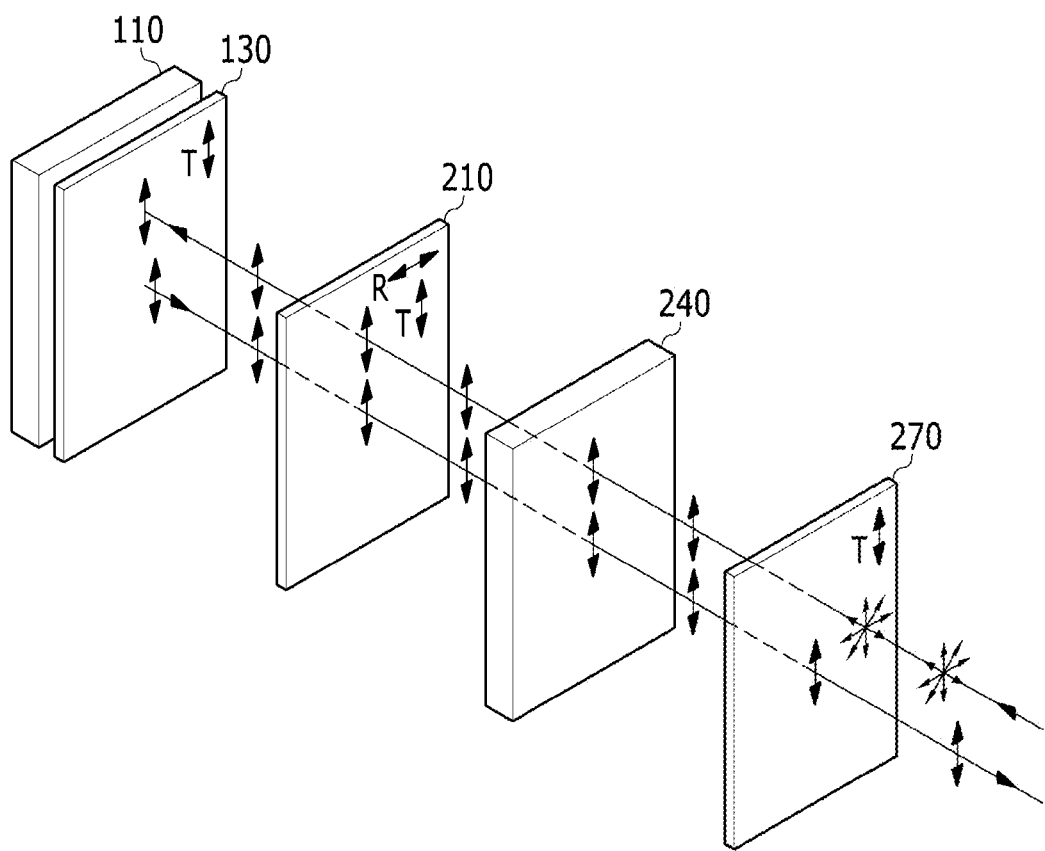
FIGS. 4A and 4B are schematic views showing operations of the liquid crystals in an ECB mode according to the exemplary embodiment.
Figure 4B:
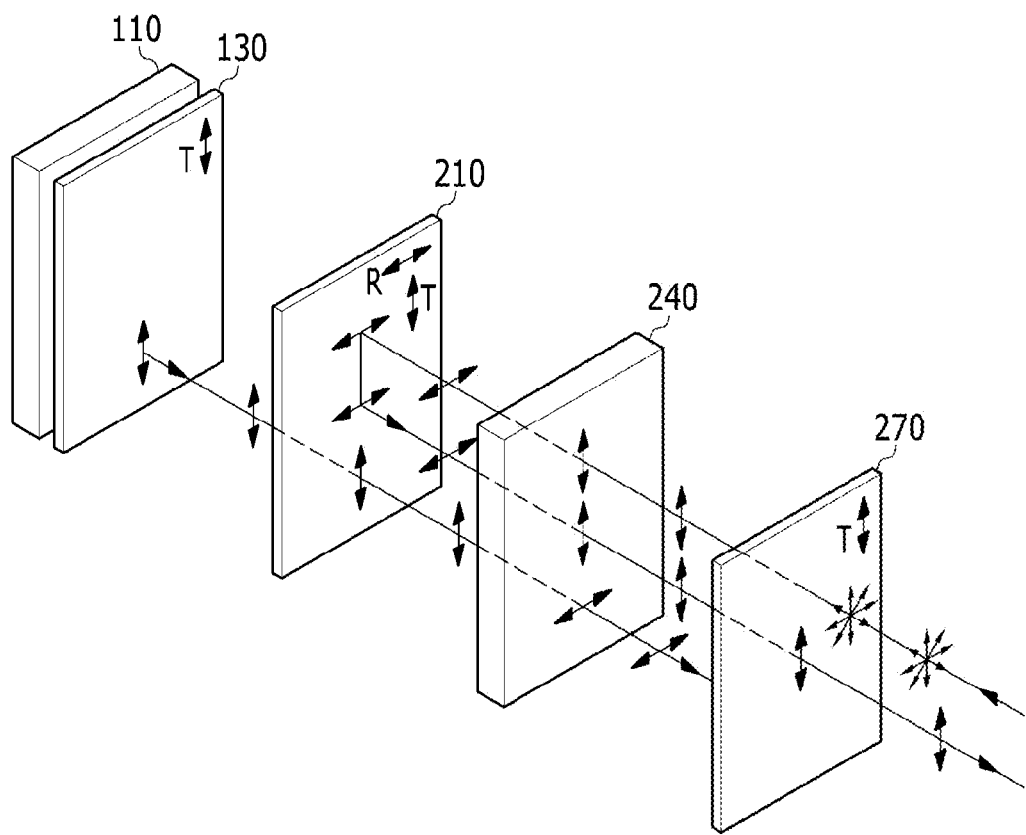
Figure 5A:
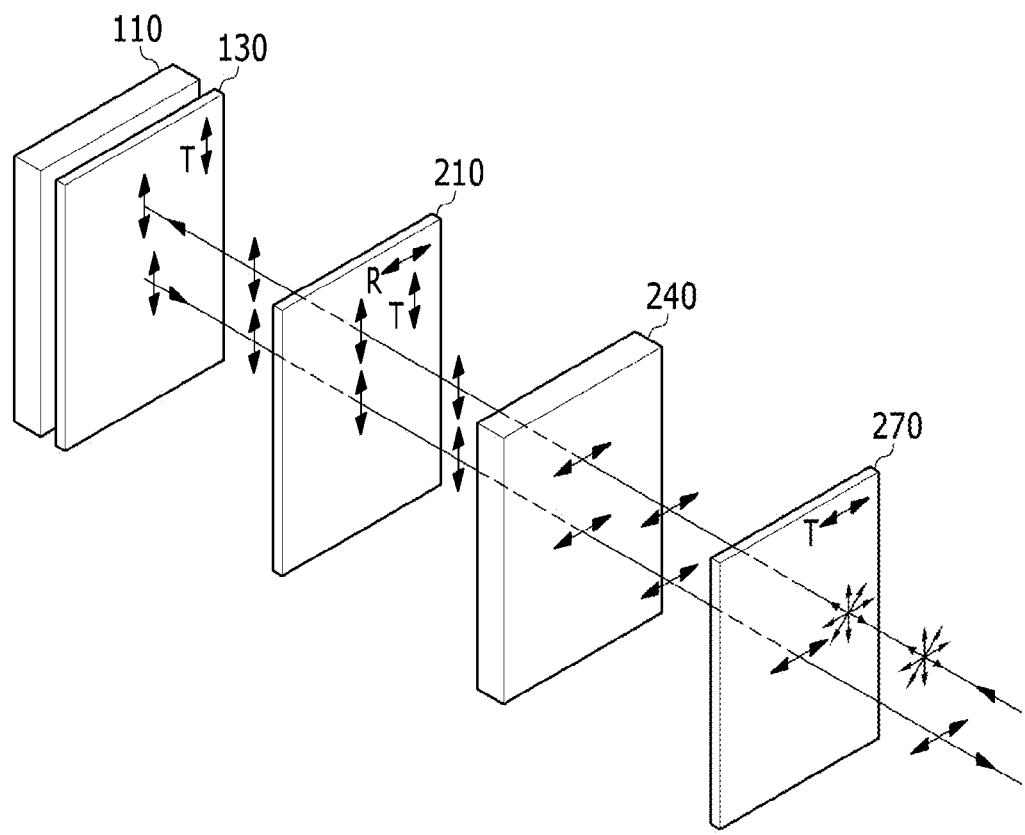
FIGS. 5A and 5B are schematic views showing operations of the liquid crystals in a VA mode according to the exemplary embodiment.
Figure 5B:
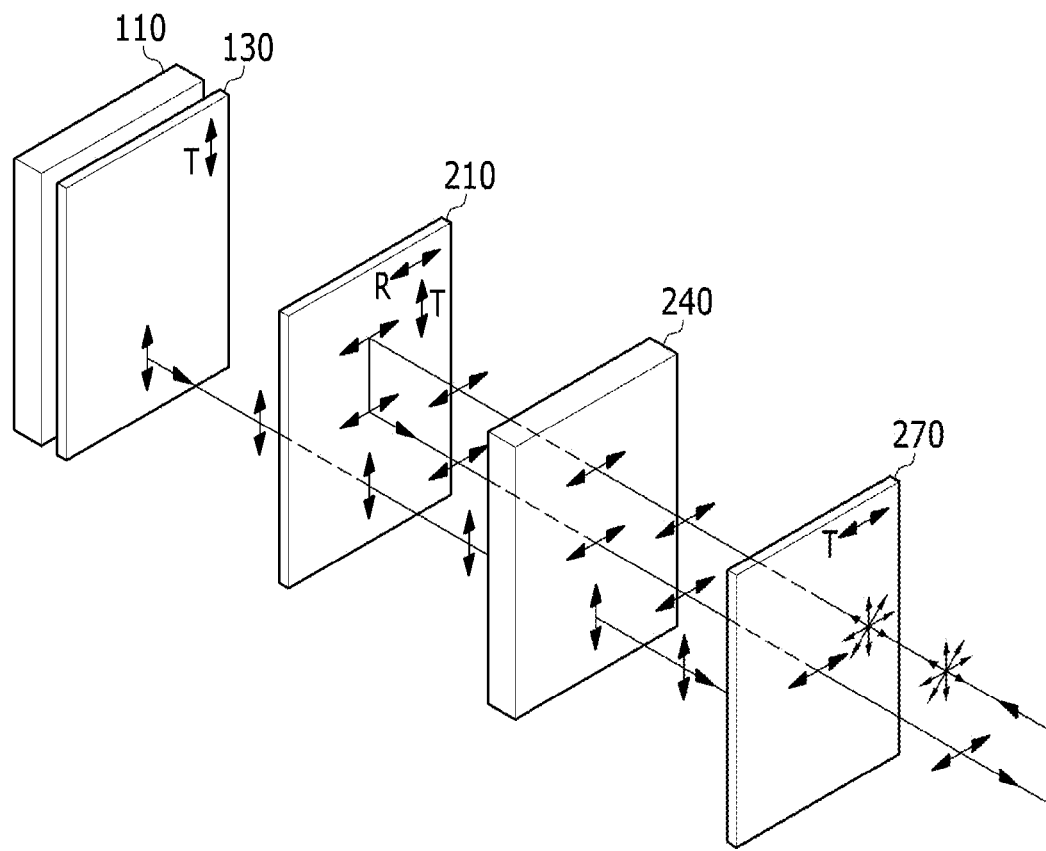

FIGS. 3A and 3B are schematic views showing operations of liquid crystals in a TN mode according to a first LC mode embodiment of the present disclosure. FIGS. 4A and 4B are schematic views showing operations of the liquid crystals in an ECB mode according to a second LC mode embodiment of the present disclosure. FIGS. 5A and 5B are schematic views showing operations of the liquid crystals in a VA mode according to a third LC mode embodiment of the present disclosure.

Referring to FIGS. 3A and 3B, FIG. 3A illustrates light transmission when no voltage(s) is(are) applied to the polarization conversion panel, while FIG. 3B illustrates light transmission when an active conversion driving voltage is applied to the polarization conversion panel.

As shown respectively in FIGS. 3A and 3B, the liquid crystals are in the TN mode, and the transmissive axes of the first polarizer 130 and the reflective polarizer 210 are parallel to each other while the transmissive axes of the reflective polarizer 210 and the absorptive polarizer 270 are perpendicular to each other.

Light transmission will be described based on this first configuration as described above.

Firstly, among incident light from the outside (shown as having polarized components extending in all 360 degree directions), only the polarized light components having the same polarization axis as the transmissive axis of the absorptive polarizer 270 passes through the absorptive polarizer 270, and the remainder of the incident-from-outside light is absorbed by the absorptive polarizer 270.

Referring to FIG. 3A, only the light in the horizontal direction ($T_{of\_270}$) is transmitted through the absorptive polarizer 270.

The polarization axis of the light that is polarized by the absorptive plate 270 in one direction is rotated by 90 degrees while passing through the liquid crystal 240 of the TN mode to which no voltage is applied in FIG. 3A.

This light which is rotated by 90 degrees therefore acquires a vertical polarization axis (corresponding to $T_{of\_210}$).

Therefore the light having the vertical polarization axis has the polarization axis parallel to the transmissive axis of the reflective polarizer 210 ($T_{of\_210}$) such that it is completely transmitted therethrough.

Such processing of light transmission is equally carried out for the light emitting out of the display panel 100 (shown as the lower light path in FIG. 3A).

The light polarized by the display panel 100 and the first polarizer 130 has the polarization axis parallel to the transmissive axis of the first polarizer 130 (vertical).

The transmissive axes of the first polarizer 130 and the reflective polarizer 210 are parallel to each other such that the light transmitted through the first polarizer 130 also passes through the reflective polarizer 210.

Next, the light transmitted through the liquid crystals of the TN mode of LC section 240 to which no voltage is applied has its polarization axis rotated by 90 degrees.

Thus, the light with the vertical polarization axis transmitted therethrough is caused to now have the horizontal polarization axis (corresponding to $T_{of\_270}$).

As the transmissive axes of the reflective polarizer 210 and the absorptive polarizer 270 are perpendicular to each other, the horizontal polarization axis is parallel to the transmissive axis of the absorptive plate 270, thereby enabling the light originally output from display device 110 to pass through the absorptive polarizer 270 so as to be seen by the user (not shown).

Thus, the light emitting out of the display panel 100 displays the image without additional polarization conversion when no voltage is applied to the polarization conversion panel 200.

Next, referring to FIG. 3B, a case in which a conversion-causing voltage is applied will be described.

Incident light from the outside has polarization axes in all directions, but only light with its polarization axis in one direction (corresponding to $T_{of\_270}$) passes through the absorptive polarizer 270 while the remainder of the light is absorbed by the absorptive polarizer 270.

As an example of the present invention, the light in the horizontal direction is transmitted.

The light desired to have a predetermined polarization axis passes through the polarization conversion panel 200 in the TN mode that is applied with the voltage while maintaining its polarization axis (no rotation).

As an exemplary embodiment, in this example the polarization axes of the reflective polarizer 210 and the absorptive polarizer 270 are perpendicular to each other, while the transmissive and reflection axes of the reflective polarizer 210 are perpendicular to each other.

As an example, the transmissive and reflective axes of the reflective polarizer 210 are respectively in the vertical and horizontal directions such that the outside light portion having its polarization axis in the horizontal direction is completely reflected by layer 210 because its polarization axis is in parallel with the reflective axis (R) of the reflective polarizer 210.

After being reflected from the reflective polarizer 210, the polarization axis of the light is rotated by 180 degrees, but linearly polarized light maintains its polarization axis even after such a 180 degree rotation.

Such a transmittance property is equally applied to the light that is propagating to the outside after being reflected from the reflective polarizer 210. Additionally, because in this configuration the LC section 240 does not rotate the vertically oriented light output from the display panel 100, when that vertically oriented light output (lowest path in FIG. 3B) gets to the absorptive polarizer 270, it is completely absorbed and the user does not see it. In other words, the user does not see that output from the display panel 100.

According to the aforementioned principles, the polarization conversion panel 200 including the liquid crystals of the TN mode passes through the image of the display panel 100 when no voltage is applied, while operating as a polarizing mirror when the conversion-activating voltage is applied to the polarization conversion panel 200 and thus blocking the output image of the display panel 100.

However, according to an exemplary embodiment of the present example, when operating as the active reflection mode of FIG. 3B, the lower electrode 230 including a plurality of sub-electrodes may selectively implement a reflective mode in which the voltage is applied to only a part of the sub-electrodes rather than to all of them.

That is, a first region or part of the display area which has applied to it the reflection-causing voltage may be operated in the reflection mode, while a second region or part of the display area which is not applied with the reflection-mode-causing voltage may be operated in the image transmissive mode.

When operating in the transmissive mode, the image may be displayed if the display panel displays the image, but no image may be displayed if no voltage is applied to the display panel.

Figure 11A:
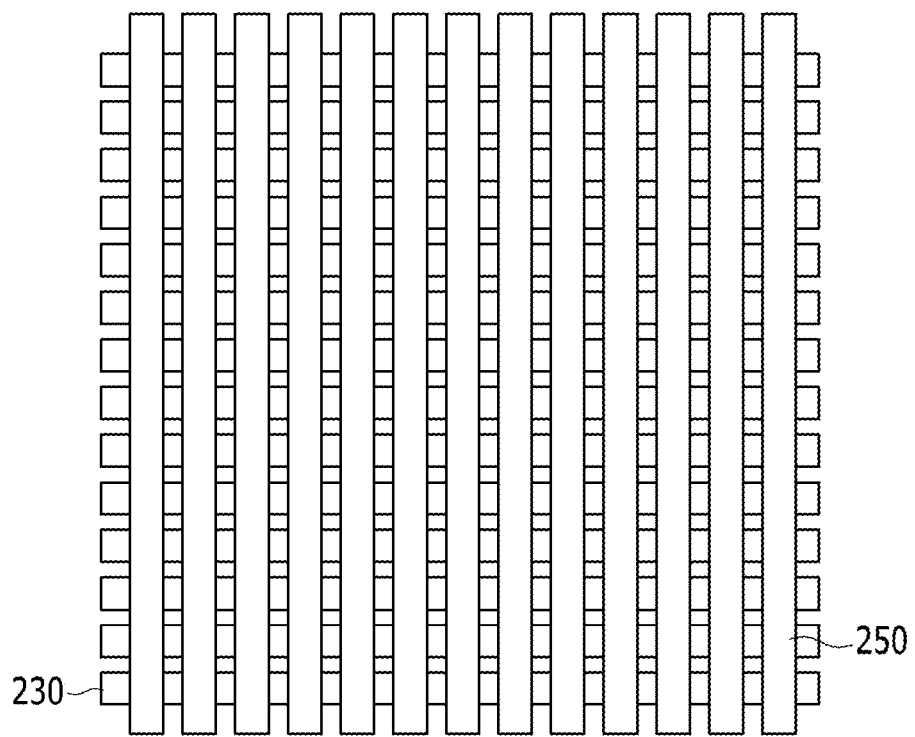
FIG. 11A is a top plan view of an embodiment having elongated linear members.
Figure 11B:
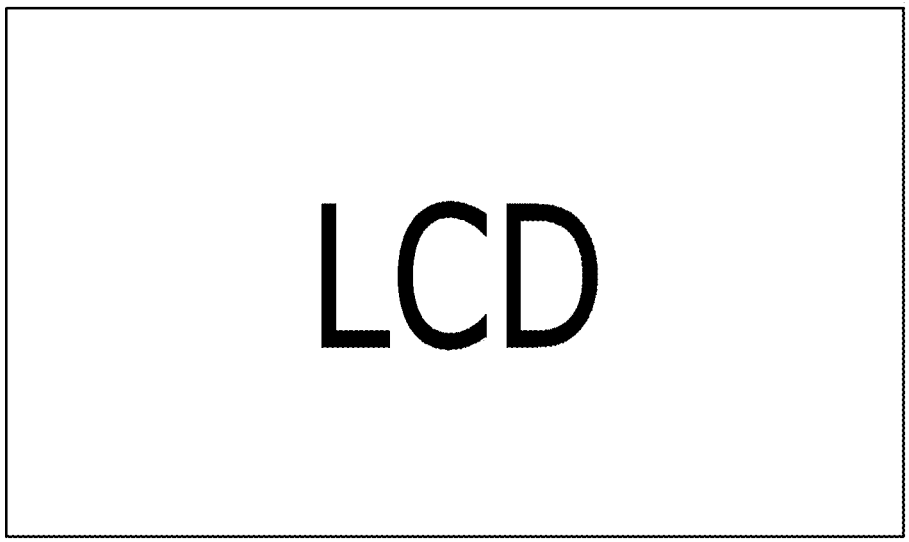
FIG. 11B is a top plan view of an embodiment showing a predetermined pattern.

Thus, if the reflection mode is implemented by applying the voltage to only a part of the plurality of patterned sub-electrodes, a user may recognize the result of the reflection mode particularly if it has a predetermined patterned shape (see briefly FIG. 11B).

Next, referring to FIGS. 4A and 4B, operation using liquid crystals of the ECB mode in the LC section 240 will be described.

Similar to as shown in FIGS. 3A and 3B, the transmissive axes of the first polarizer 130 and the reflective polarizer 210 are parallel to each other, and the transmissive and reflection axes of the reflective polarizer 210 are perpendicular to each other.

However, in this case, unlike that shown in FIGS. 3A and 3B, the transmissive axes of the absorptive polarizer 270 and the reflective polarizer 210 are parallel to each other ($T_{of\_270}=T_{of\_210}$).

Firstly, referring to FIG. 4A, a transmission path of light when the drive voltage is applied to LC section 240 is illustrated.

Among incident light from the outside, only the light having the same polarization axis as the transmissive axis (vertical) of the absorptive polarizer 270 passes through the absorptive polarizer 270, and the remainder of the light is absorbed by the absorptive polarizer 270.

Referring to FIG. 4A, as an example, only the externally incident light having the transmissive axis in the vertical direction is transmitted through absorptive polarizer 270.

Next, the polarized light passed by the absorptive polarizer 270 in one direction transmits through the liquid crystals of the ECB mode that is applied with the voltage while maintaining the same polarization axis.

The light having the vertical polarization axis has the polarization axis parallel to the transmissive axis of the reflective polarizer 210 such that it is completely transmitted therethrough to pass on so as to be incident upon the display panel 100.

Such no-rotation, light transmission processing is equally applied to the light emitting out of the display panel 100.

The light output from the display panel 100 and transmitted through the first polarizer 130 has the polarization axis parallel to the transmissive axis of the first polarizer 130.

As the polarization axes of the first polarizer 130 and the reflective polarizer 270 are parallel to each other, the light transmitted through the first polarizer 130 also passes through the reflective polarizer 270.

After passing through the reflective polarizer 210, the polarization axis of the light remains vertical.

Next, the light transmits through the liquid crystal layer 3 of the ECB mode LC section 240, to which the voltage is applied, without having its polarization axis changed.

Accordingly, the light having the vertical polarization axis maintains the polarization axis in the vertical direction.

In the present exemplary embodiment, the transmissive axes of the reflective polarizer 210 and the absorptive polarizer 270 are parallel to each other such that the light having the vertical polarization axis transmits through the absorptive polarizer 270 while being in parallel with the absorptive polarizer 270.

Accordingly, when the voltage is applied to the polarization conversion panel 200, the light emitting out of the display panel 100 may display the image without additional polarization conversion.

Next, referring to FIG. 4B, a case in which no voltage is applied will be described.

Incident light from the outside has polarization axes in all directions, but only the light with its polarization axis in one direction passes through the absorptive polarizer 270 while the remainder of the light is absorbed by the absorptive polarizer 270.

As an example of the present disclosure, the light in a vertical direction is transmitted through ($T_{of\_270}$=vertical).

The light desired to have a predetermined polarization axis transmits through the liquid crystal layer 3 of the ECB mode to which no voltage is applied such that it is rotated by 90 degrees with respect to the current polarization axis.

That is, the polarization axis of the light is rotated by 90 degrees.

As an exemplary embodiment, the polarization axes of the reflective polarizer 210 and the absorptive polarizer 270 are parallel to each other, and the transmissive and reflection axes of the reflective polarizer 210 are perpendicular to each other.

Since the transmissive and reflection axes of the reflective polarizer 210 are respectively in the vertical and horizontal directions, the light rotated by 90 degrees to have the horizontal polarization axis is completely reflected by the reflective polarizer 210 because the light's polarization axis is parallel to the reflective axis (R) of the reflective polarizer 210.

After being reflected from the reflective polarizer 210, the polarization axis of the light is rotated by 180 degrees, but linearly polarized light maintains its polarization axis even after 180 degree reflection rotation.

Such a transmittance property is equally applied to the light that is reflected from the reflective polarizer 210 to be emitted outside therefrom.

According to the aforementioned principle, the polarization conversion panel 200 including the liquid crystals of the ECB mode displays the image output by the display panel 100 when the voltage is applied, while operating as in a reflection mode when no voltage is applied.

However, according to an exemplary embodiment of the present disclosure, when operating as the reflection mode, the lower electrode including a plurality of sub-electrodes may implement a selective reflective mode in which the voltage is applied to only a part of the sub-electrodes in a corresponding only part of the display area (DA).

That is, the voltage may be applied to only a part of the plurality of sub-electrodes, while applying no voltage to the other sub-electrodes.

In this case, the first region to which no voltage is applied may operate in the reflection mode, while the second region to which the voltage is applied may operate in the transmissive mode.

In case of the transmissive mode, the image may displayed if the display panel displays the image, while no image may be displayed if no voltage is applied to the display panel.

Thus, if the reflection mode is implemented while applying no voltage to only a part of the plurality of patterned sub-electrodes, a user may recognize the reflection mode having a predetermined patterned shape.

Next, as shown in FIGS. 5A and 5B, the liquid crystals of the LC section 240 are in the VA mode, and the transmissive axes of the first polarizer 130 and the reflective polarizer 210 are parallel to each other while the transmissive axes of the reflective polarizer 210 and the absorptive polarizer 270 are perpendicular to each other ($T_{of\_270} \neq T_{of\_210}$).

In addition, the liquid crystals of the VA mode have been described, but they are not limited thereto, and the liquid crystals of an OCB mode or a PLS mode may also be included.

FIG. 5A shows how the light is transmitted when the active drive voltage is applied to the LC section 240, while FIG. 5B shows how the light is transmitted when no voltage is applied.

Firstly, among incident light from the outside, only the light having the same polarization axis as the transmissive axis of the absorptive polarizer 270 passes through the absorptive polarizer 270, while the remainder of the light is absorbed by the absorptive polarizer 270.

Referring to FIG. 5A, only the outside incident light in the horizontal direction is transmitted through the absorptive polarizer 270, as an example.

The polarization axis of the light that is passed through the absorptive plate 270 in one direction is rotated by 90 degrees while passing through the LC section 240 having the liquid crystals of the VA mode to which the active drive voltage is applied.

The light with its polarization axis rotated by 90 degrees therefore has a vertical polarization axis.

The light having the vertical polarization axis has the polarization axis parallel to the transmissive axis of the reflective polarizer 210 such that it is completely transmitted therethrough. Therefore it passes on to be incident upon the display panel 100.

Such light transmission processing is equally applied to the image-defining light emitting out of the display panel 100.

The light polarized by the display panel 100 and the first polarizer 130 has a polarization axis parallel to the transmissive axis of the first polarizer 130.

The transmissive axes of the first polarizer 130 and the reflective polarizer 210 are parallel to each other such that the light transmitted through the first polarizer 130 also passes through the reflective polarizer 210.

Next, the light transmitted through the LC section 240 having the liquid crystals of the VA mode to which the active drive voltage is applied has its polarization axis rotated by 90 degrees.

Thus, the incident light having the vertical polarization axis is emitted to the outside such that it has the horizontal polarization axis and the user sees the image-defining light emitting out of the display panel 100.

Since the transmissive axes of the reflective polarizer 210 and the absorptive polarizer 270 are perpendicular to each other, the light having the horizontal polarization axis passes through the absorptive polarizer 270 because its polarization axis is parallel to the transmissive axis of the absorptive polarizer 270.

Thus, the light emitting out of the display panel 100 displays the image without having additional polarization conversion when the voltage is applied to the polarization conversion panel 200.

Next, referring to FIG. 5B, a case in which the activating voltage is not applied to the LC section 240 will be described.

Incident light from the outside has polarization axes in all directions, but only the light with its polarization axis in one direction passes through the absorptive polarizer 270 while the remainder of the light is absorbed by the absorptive polarizer 270.

As an example of the present disclosure, the light in the horizontal direction is transmitted.

The light desired to have a predetermined polarization axis passes through the liquid crystals of the VA mode to which no voltage is applied while maintaining the current horizontal polarization axis (no rotation).

As the exemplary embodiment here, the transmissive axes of the reflective polarizer 210 and the absorptive polarizer 270 are parallel to each other, and the transmissive and reflective axes of the reflective polarizer 210 are perpendicular to each other.

The transmissive axis of the reflective polarizer 210 is in the vertical direction and the reflective axis (R) thereof is in the horizontal direction such that the light having the horizontal polarization axes is completely reflected as it is parallel to the reflective axis (R) of the reflective polarizer 210.

Such light transmission is equally applied to the light that is reflected from the reflective polarizer 210 to be emitted to outside therefrom.

According to the aforementioned principles, the polarization conversion panel 200 including the LC section 240 having liquid crystals of the VA mode operates in reflection mode when no drive voltage is applied, while operating in transmissive mode (letting through the image output of the display panel 100) when the active drive voltage is applied.

However, according to the exemplary teachings of the present disclosure of invention, when operating as the reflection mode, the lower electrode includes a plurality of sub-electrodes such that it can selectively implement a reflective mode in only a part of the display area (DA) where a correspondingly selected subset of sub-electrodes are not actively driven so to be there operated as in the reflection mode while transmissive mode is present elsewhere.

That is, the voltage may be applied to only a part of the plurality of sub-electrodes, while applying no voltage to the other sub-electrodes.

Thus, a first subregion of the display area (DA) whose sub-electrodes are applied with the active drive voltage may be operated in the transmissive mode, while the second subregion applied with no voltage may be operated in the reflection mode.

When operating in the transmissive mode, the image output by the display panel 100 may be output for viewing by the user (if the display panel displays the image), but no output of the display panel 100 may be seen if no activating voltage is applied to the LC section 240 of the area-selective polarization conversion panel 200.

Thus, if the reflection mode is implemented by applying the voltage to only a part of the plurality of patterned sub-electrodes, a user may recognize the reflection mode showing a predetermined patterned shape.

Thus, if the reflection mode is implemented by applying or not applying the voltage to only a part of the plurality of patterned sub-electrodes, a user may recognize the reflection mode having a patterned shape.

A manufacturing method of a display device according to an exemplary embodiment of the present disclosure will now be described with reference to FIGS. 1 and 2.

Firstly, a display panel 100 is prepared.

In the present specification, the display panel 100 is a liquid crystal display (LCD) panel in which the liquid crystal layer is controlled by its own vertical electric field as has been described above, but it is not limited thereto. Alternatively, the display panel 100 may be a display device such as a plasma display panel (PDP), an organic light emitting diodes display (OLED) device, a surface conduction electron-emitter display (SED), a field emission display (FED), a vacuum fluorescent display (VFD), an e-paper, and the like. In other words, the display panel 100 may be one that directly emits its own light in the case for example of an OLED device, or the display panel 100 may be one that utilizes backlighting (500) in the case for example of an LCD device, or the display panel 100 may be one that utilizes frontlighting in the case for example of an electrophoretic or e-paper device.

In addition, there is the optional preparing of a first polarizer 130 positioned between the display panel and a reflective polarizer 210 and having same-way aligned transmissive axes ($T_{of\_130}=T_{of\_210}$) when the display panel 100 is the liquid crystal panel. Also include in such a case is the preparing a backlighting unit 500 and of a second polarizer at the side opposite to a side.

Next, a reflective polarizer 210 and an absorptive polarizer 270 spaced apart from and facing the reflective polarizer 210 are prepared.

The reflective polarizer 210 has a transmissive axis parallel to a transmissive axis of the first polarizer 130, and includes a reflective axis (R) extending in a direction different from (e.g., perpendicular to) its transmissive axis T.

Light that vibrates in a direction parallel to the transmissive axis of the reflective polarizer 210 is transmitted, while light that vibrates in a direction perpendicular to the transmissive axis, that is, a direction parallel to the reflection axis, is reflected.

A reflective polarization film may be used as the reflective polarizer 210, and a dual brightness enhancement film (DBEF), a wire grid polarizer (WGP), or a TiO2 multilayer film may be used, as an example, but it is not limited thereto.

The absorptive polarizer 270 has a predetermined transmissive axis ($T_{of\_270}$). The transmissive axis of the absorptive polarizer 270 may be perpendicular or parallel to the axis of the reflective polarizer 210 depending on the liquid crystal mode used in the LC section 240.

The light vibrating in a direction parallel to the transmissive axis of the absorptive polarizer 270 may pass through the absorptive polarizer 270, and the remainder of the light is absorbed by the absorptive polarizer 270.

Next, an upper electrode and a lower electrode are prepared to be respectively positioned on the reflective and absorptive polarizers.

Though not illustrated in the present specification, the lower and upper electrodes 230 and 250 may be respectively positioned on a supporting substrate.

The substrate may be positioned between the lower electrode 230 and the reflective polarizer 210 or between the upper electrode 250 and the absorptive polarizer 270.

Further, the lower and upper electrodes 230 and 250 may be made of a transparent conductive oxide (TCO) as an example (more specifically, ITO or IZO as examples).

One of the upper and lower electrodes 230 and 250 may be formed to include a plurality of sub-electrodes that are electrically separated, and the plurality of sub-electrodes are divided into at least two regions respectively driven according to respective drive voltages applied thereto.

One of the lower and upper electrodes 230 and 250 may include a plurality of sub-electrodes, and as shown in FIG. 2, in that case it is the lower electrode that includes the plurality of respectively driven sub-electrodes 231 and 233.

The plurality of the sub-electrodes 231 and 233 are not limited to a fixed shape, but the plurality of sub-electrodes 231 and 233 combined together should cover at least the entire display area (DA) of the display panel 100, and the plurality of sub-electrodes 231 and 233 may partially overlap each other.

The plurality of sub-electrodes 231 and 233, as shown in FIG. 2, may be stripe-shaped linear members, and linear members having a fixed width may be disposed in parallel to each other.

In this case, each linear member is applied with a respective predetermined drive voltage signal so as to generate respective electric fields in the LC section 240 with the aid of the upper electrode 250.

In FIG. 2, a configuration in which the lower electrode includes a plurality of sub-electrodes, but it is not limited thereto, and another configuration in which the upper electrode includes a plurality of sub-electrodes may also be provided.

Further, the at least two regions may be formed to be independently driven.

That is, independent driving may be possible as the regions are applied with respective drive voltages.

Further, according to another exemplary embodiment to be described later, one of upper and lower electrodes may be formed to include: a plurality of first sub-electrodes spaced apart by a predetermined interval; an insulating layer positioned on the plurality of first sub-electrodes; and a plurality of second sub-electrodes positioned on the insulating layer to cross the plurality of first sub-electrodes and spaced apart from each other.

Further, according to another exemplary embodiment, one of upper and lower electrodes may be formed to include a first sub-electrode, and an insulating layer positioned on the first sub-electrode, wherein one of the first and second sub-electrodes may have a planar shape while the other may include a plurality of linear shapes.

The exemplary embodiment including the upper and lower electrodes will be described later in detail with reference to FIGS. 6 to 11.

Next, liquid crystal molecules are injected between the upper and lower electrodes.

The liquid crystal molecules 31 may be pre-aligned by use of one or more alignment layers and then realigned within the liquid crystal layer 3 positioned between the lower and upper electrodes 230 and 250 by applying an electric field therethrough.

Thus, rotation and phase delay of incident light toward the polarization conversion panel 200 can be adjusted by controlling the electric field between the lower and upper electrodes 230 and 250 from 0 V to a predetermined voltage.

When formed as described above, the display device provided with the reflection mode, which generates patterns according to the driving mechanism described above with reference to FIGS. 3 to 5, can be provided.

Shapes of upper and lower electrodes according to another exemplary embodiment of the present invention will now be described with reference to FIGS. 6 to 11.

FIGS. 6 to 11 are partial cross-sectional views of respective polarization conversion panels according to further exemplary embodiments of the present disclosure of invention.

Figure 6:
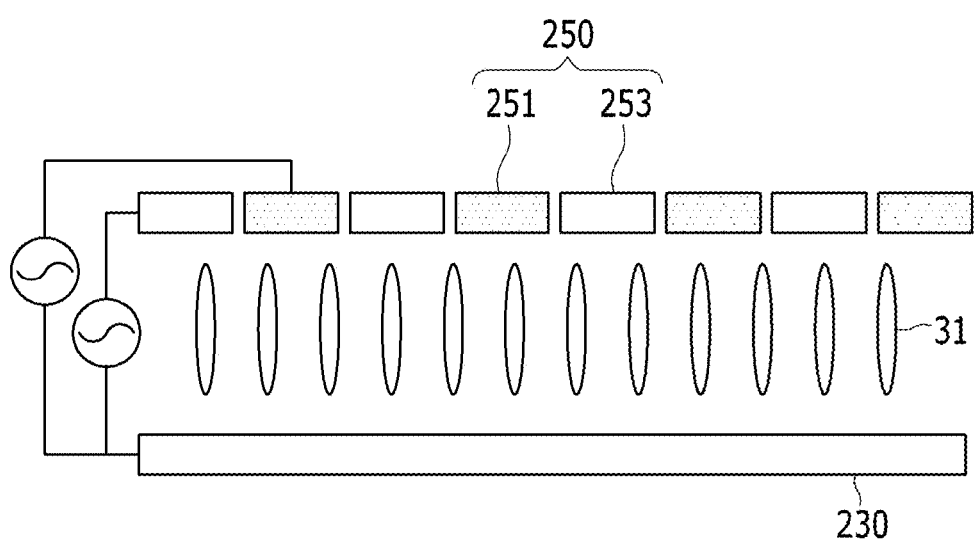
FIGS. 6 to 10 are respective schematic cross-sectional side views of respective other exemplary embodiments of respective polarization conversion panels according to the present disclosure of invention.

Referring to FIG. 6, the upper electrode 250 may include a plurality of sub-electrodes.

This case is symmetrical to a case in which the lower electrode 230 includes a plurality of sub-electrodes.

The plurality of the sub-electrodes 251 and 253 are not limited to a fixed shape, but the plurality of sub-electrodes 251 and 253 combined together should cover at least the entire display area (DA) of the display panel 100, and the plurality of sub-electrodes 251 and 253 may partially overlap each other.

The plurality of sub-electrodes 251 and 253, as shown in FIG. 6, may be stripe-shaped linear members, and linear members having a fixed width may be disposed in parallel to each other.

In this case, each linear member is applied with a predetermined voltage to generate respective electric fields together with the lower electrode 230.

The predetermined drive voltage signal may have a plurality of values, and the plurality of sub-electrodes may be applied with respective ones of a plurality of drive voltages so as to be divided into a plurality of respectively driven regions.

Referring to FIG. 6, as an example, the sub-electrodes 251 may be applied with a first voltage while the sub-electrodes 253 may be applied with a second voltage.

Thus, a first region where the sub-electrodes 251 applied with the first voltage generate the electric field along with the upper electrode 230 and a second region where the sub-electrodes 253 applied with the second voltage generate the electric field along with the upper electrode 230 may be respectively present.

As an example, the exemplary embodiment in which two independent voltages are applied to be divided into two sub-regions has been described, but it is not limited thereto, and another exemplary embodiment in which a plurality of independent voltages are applied to be divided into a plurality of sub-regions may also be possible.

Figure 7:
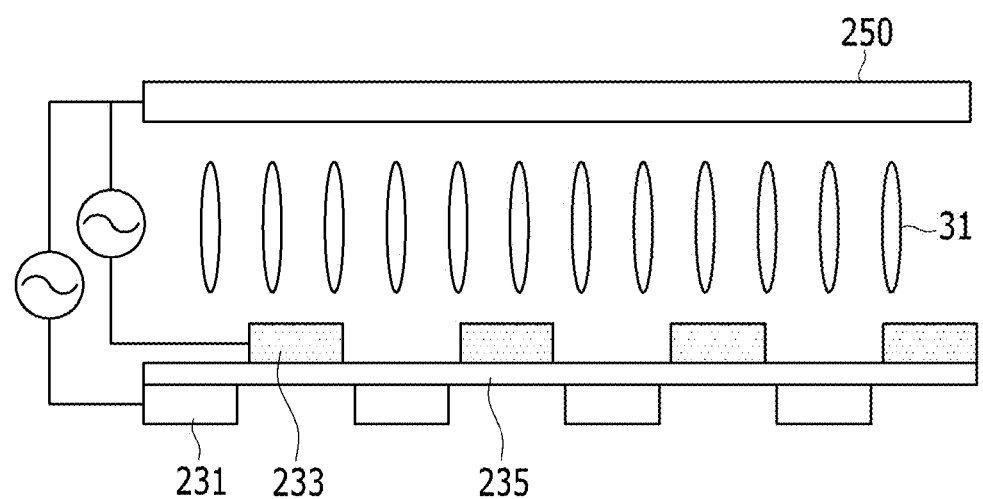

Next, as shown in FIG. 7 as another exemplary embodiment, the lower electrode 230 may include: a plurality of first sub-electrodes 231 spaced apart by a predetermined interval; a light-passing insulating layer 235 positioned on the plurality of first sub-electrodes 231; and a plurality of second sub-electrodes 233 spaced apart from each other while disposed on the insulating layer 235 and extended so as to be interdigitated with and/or to cross with the plurality of first sub-electrodes 231.

Referring to FIG. 7, the lower electrode 230 includes patterned first sub-electrodes 231 and patterned second sub-electrodes 233.

The patterned first and second sub-electrodes 231 and 233 are separately layered such that the insulating layer 235 is disposed therebetween to insulate them.

The patterned first and second sub-electrodes 231 and 233 may be elongated linear members, and may have a long rod shape as shown in FIG. 11A.

The plurality of first and second sub-electrodes 231 and 233 may be disposed to be spaced apart from each other by a fixed distance, and the first and second sub-electrodes 231 and 233 may be alternately disposed to cover the entire region on the plane.

In addition, as shown in FIG. 7, when the first and second sub-electrodes 231 and 233 are used and interdigitated as shown, the first and second sub-electrodes 231 and 233 do not overlap each other to thereby reduce wasteful cross-coupling of the respective drive signals (and also to reduce danger of shorting, etc. if more conductive material for the electrodes is used than necessary).

Figure 8:
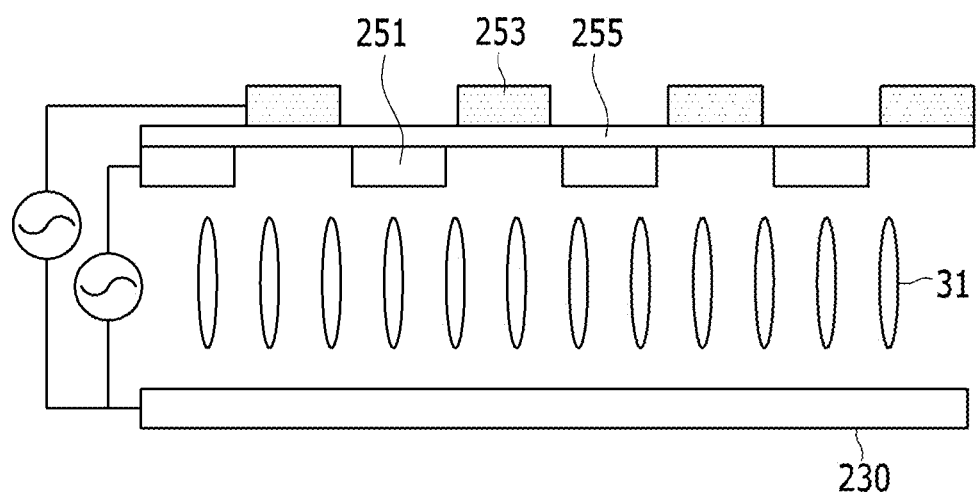

Next, as shown in FIG. 8, the upper electrode 250 may include: a plurality of first sub-electrodes 251 spaced apart by a predetermined interval; an insulating layer 255 positioned on the plurality of first sub-electrodes 251; and a plurality of second sub-electrodes 253 spaced apart from each other while disposed on the insulating layer 255 and elongated for example to cross the plurality of sub-electrodes in lower layer 230.

The patterned first and second sub-electrodes 251 and 253 may be linear members, and may have, as shown in FIG. 8, a long rod shape as an example.

The plurality of first and second sub-electrodes 251 and 253 may be disposed to be spaced apart from each other by a fixed interval, and the first and second sub-electrodes 251 and 253 may be alternately disposed to cover the entire region on the plane.

In addition, as shown in FIG. 8, when the first and second sub-electrodes 251 and 253 are used, the first and second sub-electrodes 251 and 253 do not overlap each other (for example to reduce signal interference).

Figure 9:
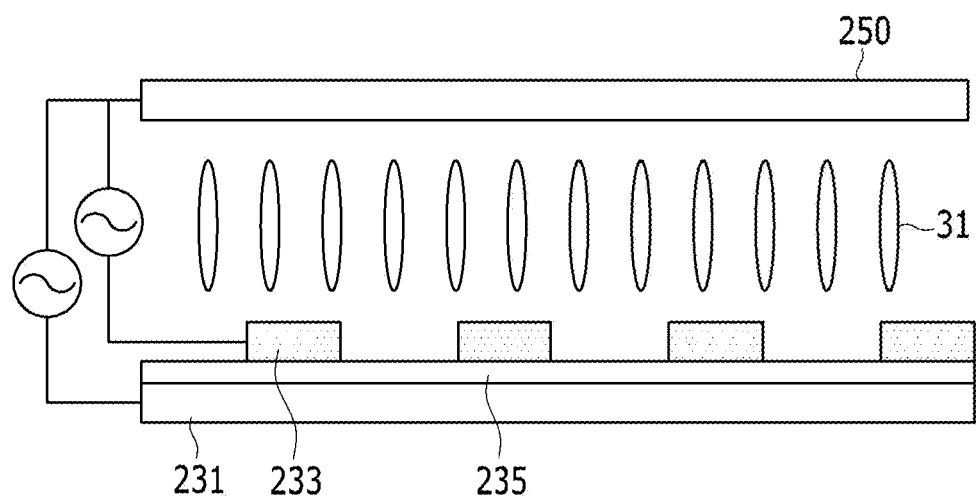

Next, as shown in FIG. 9, the lower electrode 230 may include a first sub-electrode 231 extending at least in a first direction, an insulating layer 235 positioned on the first sub-electrode 231, and second sub-electrodes 233 positioned on the insulating layer 235 and extending at least in a second direction crossing with the first direction. In one embodiment, one of the first and second sub-electrodes 231 and 233 may have a planar shape while the other may include a plurality of linear shapes.

That is, the first sub-electrode 231 positioned at a lower part has a planar shape, while the second sub-electrode 233 positioned thereon, as shown in FIG. 7 or FIG. 8, may have a long rod shape as an example.

In the exemplary embodiment shown in FIG. 9, where the first sub-electrode 231 is plane-shaped and disposed on the lower side, it may be applied or may not be applied with a respective first drive voltage so as to be driven in the transmissive or the entire reflection mode, or the linear second sub-electrode 233 disposed on the upper side may be applied or may not be applied with the drive voltage to be driven in a partially patterned reflection mode.

Figure 10:
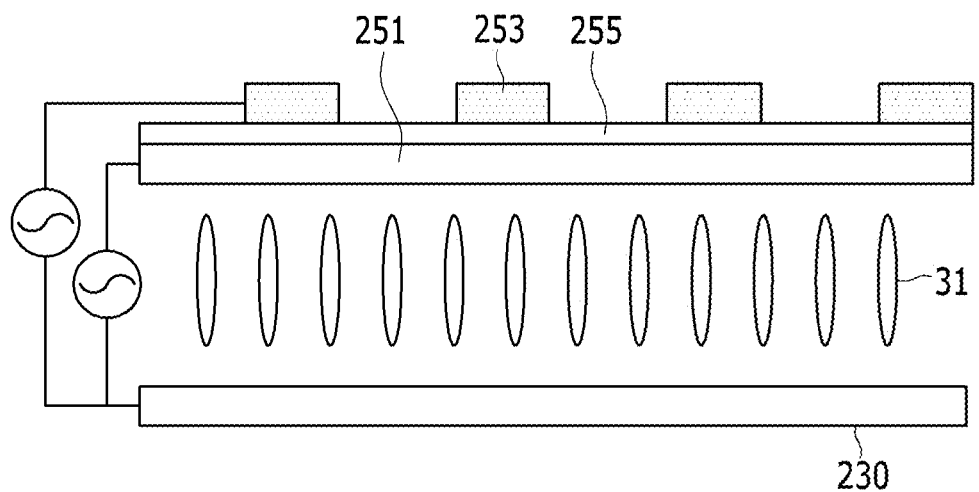

Next, as shown in FIG. 10, an upper electrode 250 may include a first sub-electrode 251, an insulating layer 255 disposed on the first sub-electrode 251, and a second sub-electrode 253 disposed on the insulating layer 255, and one of the first and second sub-electrodes 251 and 255 may have a planar shape while the other may include a plurality of linear shapes.

That is, the first sub-electrode 251 disposed at the upper part is layered to have a planar shape, while the second sub-electrode 253, as shown in FIG. 7 or FIG. 8, may be linearly formed in a long rod shape as an example.

In the exemplary embodiment as shown in FIG. 10, the plane-shaped first sub-electrode 251 disposed on the upper part may be applied or may not be applied with a first drive voltage so as to be driven in the transmissive or the entire reflection mode, or the linear second sub-electrode 253 disposed on the lower part may be applied or may not be applied with a respective second drive voltage to be driven in a partially patterned reflection mode.

Further, a case in which the voltage is applied or not applied to some of the plurality of second sub-electrodes 253 may also be possible.

Next, as shown in FIG. 11A, the upper and lower electrodes 250 and 230 may include a plurality of linear members extending in respective directions.

The upper and lower electrodes 250 and 250 may both include a plurality of sub-electrodes, and the plurality of sub-electrodes, as shown in FIG. 11A, may be stripe-shaped lines as an example.

The upper and lower electrodes 250 and 230 as the long rod-shaped linear members are disposed to be perpendicular to each other.

When the upper electrodes 250 are arranged in a vertical direction, the lower electrodes 230 are arranged in a horizontal direction, or vice versa.

Thus, when the electrodes are formed in a passive matrix form as described above, various patterned reflection modes with various shapes can be implemented.

This is because the reflection mode may be implemented by applying or not applying the drive voltage to an electronically determined subarea of the display area, while the transmissive mode may be implemented by applying or not applying the voltage to the remaining regions.

FIG. 11B according to the exemplary embodiment described above shows that a predetermined pattern (e.g., forming the large letters "LCD" with use of the reflective mode) is implemented by applying the voltage to a fixed region or no voltage to the region other than the fixed region.

FIGS. 12A to 12D are experimental images illustrating the polarization conversion panel operated in various modes according to a exemplary embodiment.

Figure 12A:
FIGS. 12A to 12D are experimental images illustrating the polarization conversion panel operated in various modes according to an exemplary embodiment of the present disclosure of invention.

FIG. 12A shows a planar image of the polarization conversion panel (taken alone without a display panel 100) implementing the transmissive mode, below which a printed material is placed (the printed material being in place of a reflective type display panel 100).

As the polarization conversion panel is in the transmissive mode, the printed material placed thereunder is displayed, and when the display panel is used in place of the printed material, the image that the display panel displays can be seen.

Figure 12B:
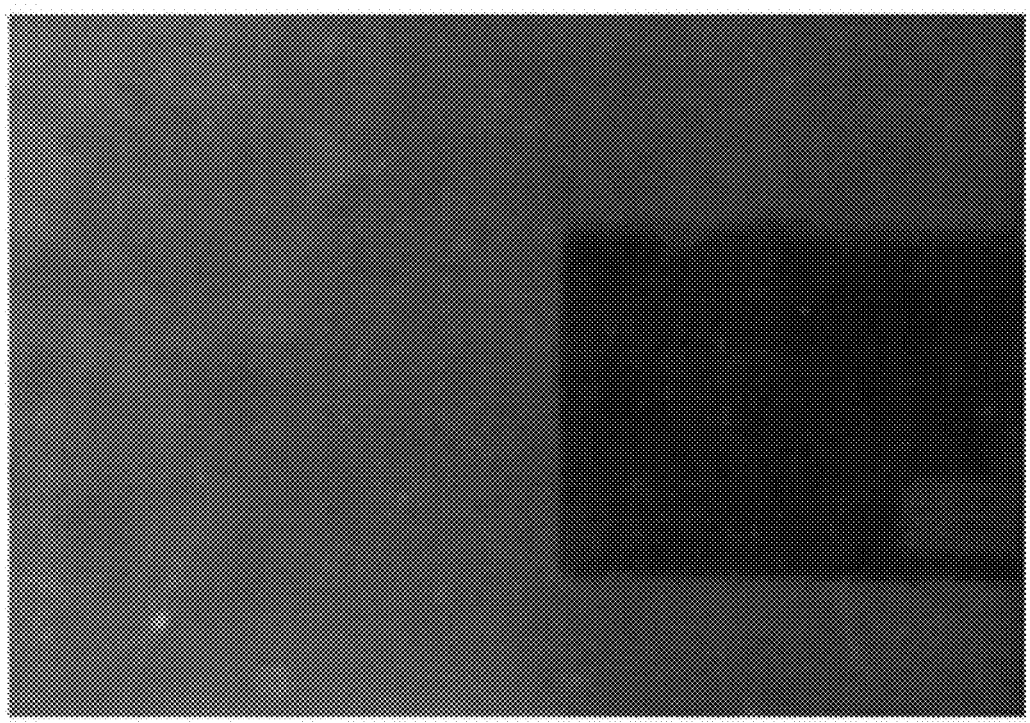

FIG. 12B shows a planar image of the polarization conversion panel implementing the reflection mode, on which a photographing image (a reflection of the camera taking the picture) is shown on the reflection by implementing a full reflection mode depending on whether the voltage is applied to the polarization conversion panel or not.

Figure 12C:
Figure 12D:
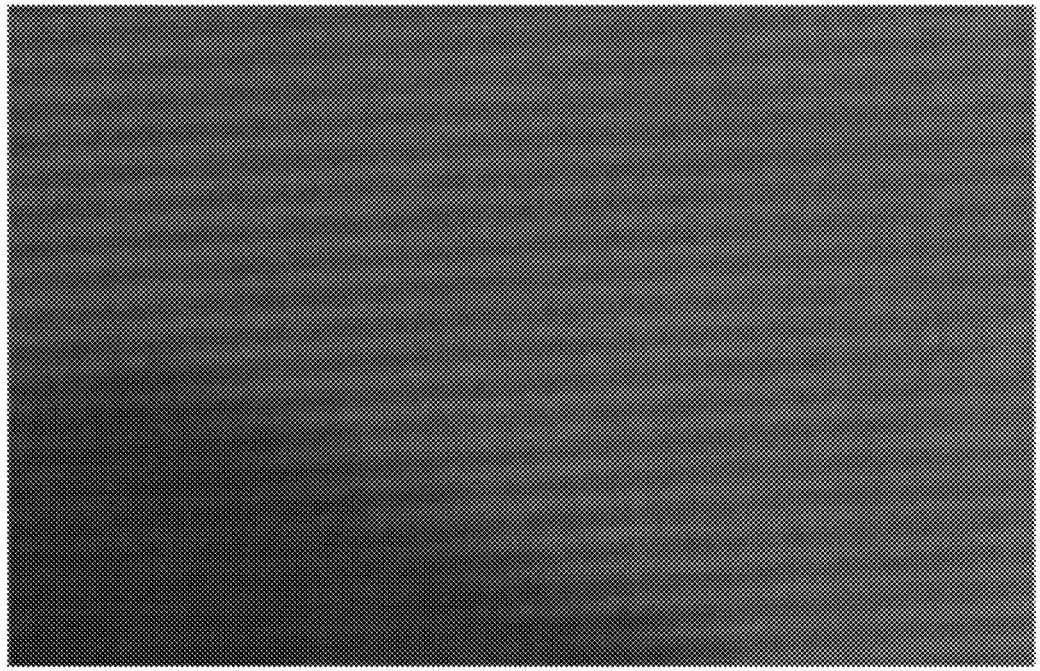

FIG. 12C shows a planar image of the polarization conversion panel implementing the partially patterned reflection mode. Referring to FIG. 12D, the photographing image is partially reflected on regions operated in a partial reflection mode while the image of the printed material placed under the polarization conversion panel is displayed on other regions operated in the transmissive mode.

The polarization conversion panel shown in FIGS. 12C and 12D shows the exemplary embodiment in which the sub-electrodes are stripe-shaped linear members that are alternately positioned. Such shapes can be recognized by close examination of FIG. 12D.

In addition, as the polarization conversion panel is in a partial transmissive mode, the printed material is partially recognized in FIGS. 12C and 12D, but when the display panel is placed under the polarization conversion panel, the image may be displayed or a plane to which no voltage is applied except for patterned reflective regions, that is, a black background may be recognized.

The display device according to the exemplary embodiments of the present disclosure of invention may display the image on the plane of the display device by the patterned electrodes included in the polarization conversion panel or implement the full reflection mode, or may implement the partially patterned reflection mode.

While this disclosure of invention has been described in connection with what is presently considered to be practical exemplary embodiments, it is to be understood that the present teachings are not limited to the disclosed embodiments, but, on the contrary, are intended to cover various modifications and equivalent arrangements included within the spirit and scope of the teachings.

What is claimed is:

1. A display device comprising:
   a display panel having a display area configured to produce a displayable first image; and
   a polarization conversion panel positioned on the display panel and operatively covering at least the display area of the display panel,
   wherein the polarization conversion panel includes:
      a reflective polarizer positioned on the display panel;
      a light-passing lower electrode(s) layer positioned on the reflective polarizer;
      a light-passing upper electrode(s) layer spaced apart from and facing the lower electrode(s) layer;
      liquid crystals positioned between the upper and lower electrodes;
      an absorptive polarizer positioned on the upper electrode; and
      wherein at least one of the upper and lower electrode(s) layers is subdivided to include a respective plurality of sub-electrodes that are electrically separated from each other so as to be independently driveable by respective drive voltages, and
   wherein at least one of the lower electrode(s) layer and the upper electrode(s) layer includes:
      a light-passing insulating layer;
      a plurality of first sub-electrodes spaced apart by a predetermined interval and disposed on an upper surface of the light-passing insulating layer; and
      a plurality of second sub-electrodes spaced apart from each other while disposed on a lower surface of the light-passing insulating layer.

2. The display device of claim 1, wherein
   the lower electrode(s) layer includes a plurality of sub-electrodes, and
   the plurality of sub-electrodes are divided into at least two regions that are independently driveable by respective drive voltages applied thereto.

3. The display device of claim 1, wherein
   the upper electrode(s) layer includes a plurality of sub-electrodes, and
   the plurality of sub-electrodes are divided into at least two regions that are independently driveable by respective drive voltages applied thereto.

4. The display device of claim 1, wherein
   one of the first and second sub-electrodes has a respective first shape and size covering a corresponding first planar area while the other has a respective second shape and size where at least one of the second shape and second size is different from the corresponding shape and size of the other of the first and second sub-electrodes.

5. The display device of claim 1, wherein
   the upper and lower electrode(s) layers are made of a transparent conductive oxide (TCO).

6. The display device of claim 1, and further comprising:
at least two drive voltage signal sources operatively coupled to a corresponding at least two respective sub-electrodes of one of the electrode(s) layers so as to independently drive the at least two respective sub-electrodes with respective drive voltages.

7. The display device of claim 1, wherein
a first polarizer disposed between the display panel and the reflective polarizer is further included, and
transmissive axes of the first polarizer and the reflective polarizer are parallel to each other.

8. The display device of claim 7, wherein
the transmissive axis of the reflective polarizer is perpendicular to that of the absorptive polarizer.

9. The display device of claim 7, wherein
the transmissive axis of the reflective polarizer is parallel to that of the absorptive polarizer.

10. The display device of claim 7, wherein
the transmissive axis of the reflective polarizer is perpendicular to its reflective axis.

11. A manufacturing method of a display device, comprising:
providing a display panel configured to form a first displayable image;
disposing a reflective polarizer on the display panel;
disposing an absorptive polarizer to be spaced apart from and facing the reflective polarizer;
providing an upper electrode(s) layer and a lower electrode(s) layer respectively positioned on the reflective polarizer and under the absorptive polarizer; and
providing liquid crystals between the upper and lower electrode(s) layers, wherein
at least one of the upper and lower electrode(s) layers includes a respective plurality of sub-electrodes that are electrically separated from each other, and
wherein at least one of the lower electrode(s) layer and the upper electrode(s) layer includes:
a light-passing insulating layer,
a plurality of first sub-electrodes spaced apart by a predetermined interval and disposed on an upper surface of the light-passing insulating layer, and
a plurality of second sub-electrodes spaced apart from each other while disposed on a lower surface of the light-passing insulating layer.

12. The method of claim 11, wherein
the plurality of sub-electrodes are disposed within at least two different regions of a display area of the display panel and are operatively coupled to receive a corresponding at least two independent drive voltages for respectively controlling the at least two different regions.

13. The method of claim 12, wherein
the two independent drive voltages are configured such that one of the at least two regions is driven in a reflection mode and the other in a transmissive mode.

14. The method of claim 11, wherein
one of the first and second sub-electrodes is formed in a shape and/or size different from that of the other.

15. The method of claim 11, wherein
the upper and lower electrode layers are formed of a transparent conductive oxide (TCO).

16. The method of claim 11, further comprising
providing a first polarizer disposed between the display panel and the reflective polarizer.

* * * * *